United States Patent [19]

Barnes

[11] 4,403,884
[45] Sep. 13, 1983

[54] WIRE ASSEMBLIES FOR REPETITIVE, CONTINUOUS CYCLE, TENSILE LOAD CONDITIONS, PARTICULARLY SUCKER RODS FOR OIL WELLS

[75] Inventor: Kenneth C. Barnes, Orange Park, Fla.

[73] Assignee: Florida Wire and Cable Company, Jacksonville, Fla.

[21] Appl. No.: 245,139

[22] Filed: Mar. 18, 1981

[51] Int. Cl.³ .......................... B25G 3/28; F16G 11/00
[52] U.S. Cl. ..................................................... 403/284
[58] Field of Search ............... 403/284, 285, 274, 282, 403/373; 29/517

[56] References Cited

U.S. PATENT DOCUMENTS

| 2,668,280 | 2/1954 | Dupre | 403/284 X |
| 2,910,983 | 11/1959 | Everett | 403/284 X |
| 3,013,793 | 12/1961 | Howell et al. | 403/220 X |
| 3,149,860 | 9/1964 | Hallesy | 403/284 X |
| 3,212,582 | 10/1965 | Brown | 166/242 |
| 3,384,704 | 5/1968 | Vockroth | 403/284 X |
| 3,471,904 | 10/1969 | Aho | 403/284 X |

Primary Examiner—Wayne L. Shedd
Attorney, Agent, or Firm—William R. Hinds

[57] ABSTRACT

Multi-wire steel strand for use under repetitive cyclic load conditions, such as in mechanically pumped wells, is provided with end connecting pieces which are swaged into gripping engagement with the strand in a manner to avoid fatigue failure of the wire at the end connecting pieces, by avoiding abrupt load transitions in the wire. The swaging is such as to gradually and progressively transfer load from the wire strand to the end connecting pieces, preferably by virtue of a gradual and progressive increase of the grip between the wire strand and an end piece, considered in the direction of the terminal end of the strand on which the end piece is mounted, in order to gradually reduce the load in the end portion of the strand and avoid abrupt load transitions therein, which can act as stress risers. A lubricating sleeve insert prevents galling and abrading in the area of relatively slight grip where relative movement may occur, so as to avoid creating stress risers. A particular use is for oil well sucker rods, utilizing high carbon, low-relaxation, steel wire, advantageously covered with fiberglass reinforced plastic while held under tension during curing, although the invention is appropriate for many uses. The strand diameter will be varied appropriately to suit particular conditions.

21 Claims, 3 Drawing Figures

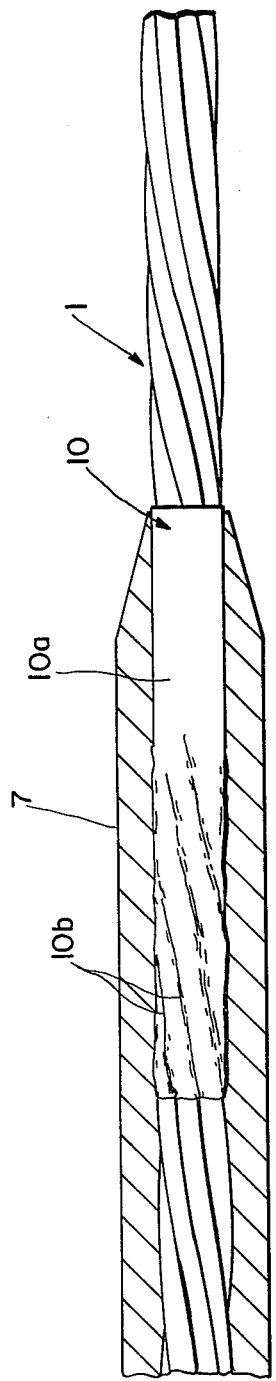
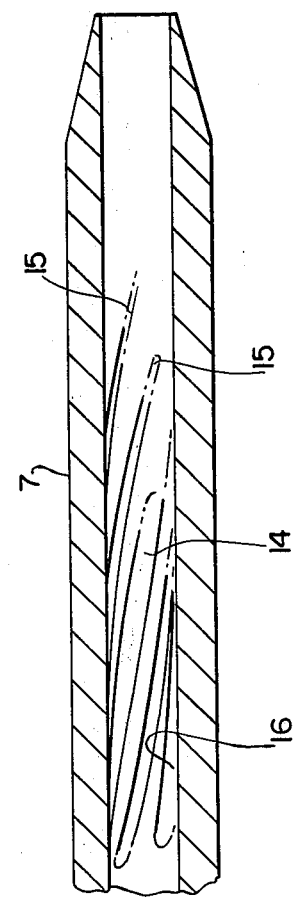

WIRE ASSEMBLIES FOR REPETITIVE, CONTINUOUS CYCLE, TENSILE LOAD CONDITIONS, PARTICULARLY SUCKER RODS FOR OIL WELLS

FIELD OF THE INVENTION

This invention relates to wire assemblies for use under repetitive cyclic tensile load conditions, and more particularly to pump sucker rods for oil wells or other mechanically pumped wells. The invention is particularly directed to the problem of avoiding fatigue failure of the wire at its connections with end pieces, which are used to connect wire sections together, or to connect a wire section to other members. In use as a pump sucker rod, a number of the assemblies are connected together to form a sucker rod string in an oil well, where severe repetitive load conditions and corrosion and abrasion conditions exist.

BACKGROUND AND SUMMARY

Pump sucker rods in oil wells operate under severe conditions of load, abrasion and environment. They are subject to fatigue failure, corrosion, wear failure, etc., and these problems have been studied for many years, and numerous improved solutions have been proposed to the problem of optimum sucker rod structure, function and design. Durability and lightness are important features to be achieved. Typical of the approaches followed by the prior art are those disclosed in U.S. Pat. No. 4,205,926, issued June 3, 1980 (Carlson), and other prior art approaches, patents and publications mentioned therein, all of which are incorporated herein by reference.

The instant invention proposes a construction which may be of relatively light weight through the use of high carbon steel strand possessing at least approximately twice the tensile strength of most currently used rods, and in which fatigue failure of the strand is avoided or at least minimized. Sucker rods necessarily come in sections formed with end pieces or fittings for connection with other sections in assembling a sucker rod string of the requisite length. While there are advantages in using wire, strand, cable, wire rope, etc. as the major component of a sucker rod section, there has been and continues to be a definite problem of fatigue failure of the wire or the like in the area of its connection with an end piece or fitting. It is believed that this problem of fatigue failure is solved by the instant invention. The invention also proposes a construction which utilizes multi-wire, high carbon steel strand, which is lighter and stronger than materials known to me to be currently used in sucker rods, while minimizing problems of corrosion to which all strand is susceptible. The use of this lighter and stronger rod results not only in reduced pumping power cost, but also permits the use of lighter, less costly pumping units for wells of any given depth, thus reducing the capital investment. The increased strength also permits use of a lesser diameter rod, which facilitates overwrap with a protective material without increasing the diameter excessively. Such high carbon strand, because of its high strength and modulus of elasticity, also avoids problems of stretch which occur in many currently used rods. Finally, the invention proposes a construction utilizing a particularly advantageous strand, that is, low-relaxation strand, one version of which is well known for use in prestressed concrete, but which, to my knowledge, has never been used or proposed to be used in oil well sucker rods. Such low-relaxation strand has practically no creep, is highly resistant to fatigue failure, and, in common with other high carbon steels, is resistant to abrasion. While the invention finds particular utility in oil well sucker rods, it is not necessarily so limited, since there are various other uses for the invention.

Although the invention itself is as defined in the appended claims, the various features, advantages and objects of the invention will be best understood from the ensuing description of preferred exemplary embodiments, taken in conjunction with the accompanying drawings, which form a part of the instant specification and are to be read in conjunction therewith.

DESCRIPTION OF THE DRAWINGS

FIG. 2 is a partially cut-away view showing the strand and the lubricating sleeve insert after deformation or swaging.

FIG. 3 is a view corresponding to FIG. 2, but with the strand and lubricating sleeve insert removed, and illustrating the striations which are formed in the wall of the passageway of the end fitting by the deformation or swaging operation, and illustrating also the progressive increase in depth of the striations as they progress into the fitting.

DESCRIPTION OF PREFERRED EMBODIMENTS

Figure 1:
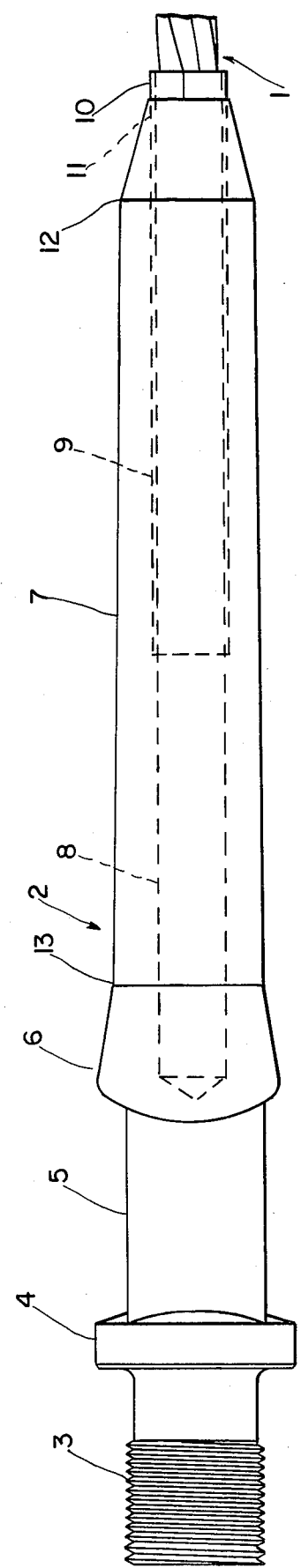
FIG. 1 shows an end portion of a multi-wire strand having mounted thereon an improved end connecting piece or fitting in accordance with the invention, before swaging or deformation of the end piece firmly onto the wire.

FIG. 1 shows an end piece or fitting generally designated 2 mounted on a multi-wire strand generally designated 1. The end piece 2, in its left-hand portion, has an outer configuration largely the same as a conventional sucker rod pin end, although it will be readily understood that a conventional box end could have been shown. Specifically, the left-hand portion has a conventional externally threaded end 3, a circumferential semi-cylindrical flange 4, wrench flat portion 5, and tapered enlarged shoulder 6. These parts and portions serve the same function as the like parts of a conventional sucker rod pin end. Thus, for example, when a sucker rod is suspended in a rack or the like, it may be suspended from shoulder 6. The wrench flat portion is for engagement of suitable wrenches for turning the sucker rod assembly. Flange 4, among other things, limits the inboard travel of a coupling threaded onto the threaded end 3, for connecting the end fitting to a corresponding fitting of another section, and for sealing the connection. In general, the left-hand portion of the fitting is in accordance with American Petroleum Institute Standard API-SPEC-11B.

Apart from the previously described left-hand portion, the end fitting 2 is unlike other end fittings for sucker rods or other such structures known to me. Fitting 2 includes a passageway 8 bored therein, and opening from the right-hand end of the fitting as viewed in FIG. 1. This passageway is enlarged as shown at 9 so as to provide clearance for a lubricating sleeve insert 10, typically comprising brass shim stock, extending partway into the passageway 8, and encompassing a corresponding portion of strand 1. Strand 1 is inserted into the full extent of passageway 8, whereas insert 10 stops at the shoulder formed between passageways 8 and 9. The bored passageway is located in an elongate body portion 7 of fitting 2. As indicated at 11, the passageway at its right-hand end is further reamed slightly so as to provide a slight outward taper. The elongate body 7 is tapered gradually outwardly from a point indicated at 12 to a point indicated at 13, adjacent shoulder 6. As a typical example, this taper might be from an outer diameter of one inch at 12 to an outer diameter of one and one-eighth inch at 13. It will be understood that this is in the unswaged condition. The purpose of the taper is to permit progressive swaging or deformation of elongate body 7 from point 12 to point 13 by swaging dies or any convenient swaging or deforming means, such that in a typical example, body 7 between points 12 and 13 will be swaged down to a uniform outer diameter of one inch. Thus, in a typical example, there will be substantially no swaging at point 12, and the degree of swaging will progressively increase up to a maximum at point 13, where the outer diameter will be swaged perhaps one-eighth inch down to a swaged diameter of one inch. The purpose of this is to progressively increase the degree of swaging from right to left, and thus progressively increase the grip of the strand 1 by the walls of passage 8, 9, and insert 10, such that when the assembly is under a repetitive cyclic tensile load, the load will be transferred from the strand 1 to the fitting 2 progressively and gradually over the strand portion inside the body 7, as opposed to an abrupt transition from full load to no load (or a substantially lesser load) in the wire strand. This will be explained in more detail subsequently.

The effects of this progressive swaging or deformation are shown in FIGS. 2 and 3. Thus, the progressive swaging forms striations 14 in the passageway wall, as the material of body 7 is deformed about the exterior wires of the strand 1. The striations begin approximately at 15, where they are very shallow, and progressively increase in depth approximately to a point indicated at 16. The corresponding striations caused in the insert 10 are also illustrated, the relatively deep striations being indicated generally at 10b, and the relatively unstriated portion of the insert being shown generally at 10a.

Because of the progressively or gradually increasing gripping engagement between the fittings and the strand, there is no abrupt load transition in the strand, that is, the strand as it passes into the fitting does not change abruptly from full load to no load. Rather, the load is transferred relatively gradually from the strand to the fitting over an appreciable length of the strand, and there is no point of abrupt load change in the wire sufficient to act as a stress riser under repetitive or pulsating tensile load conditions such as occur in a sucker rod in oil wells. In essence, the avoidance of abrupt load transition in the wire of the strand by the progressive gripping engagement avoids fatigue failure. However, in the area of relatively slight swaging and hence relatively slightly gripping engagement, there can be a slight relative movement between the strand and te shallow striations of the passageway. This tends to cause galling, abrading, etc., which can have a stress rising effect, such that failure might occur at the beginning of the striations. To avoid or minimize this possibility, the sleeve insert 10 is incorporated to act in the nature of a dry lubricant, and thus minimize or avoid any adverse affects because of any slight relative movement in the area of relatively slight gripping engagement. To achieve its purpose, the insert in general should be of a non-galling, non-abrading and non-seizing material, softer than the metal of the strand wire or the metal of the elongate body 7. Typical materials useful for the insert 10 include brass, lead, tin, copper, or alloys of any of these. As a useful example, brass shim stock of 0.005 inch thickness has been found to be generally satisfactory.

In general, in the fabrication of the initial fitting 2, before swaging, there advantageously should be a minimum clearance between passageway 8 and strand 1, and between passageway 9, insert 10 and strand 1, merely sufficient to permit easy insertion of the strand end portion fully into the passageway 8 of the fitting. For instance, when using one-half inch strand, the internal diameter of passageway 8 might range from 0.509 to 0.516 inches. If brass shim stock 0.005 inches thick is used for insert 10, passageway 9 may be of substantially 0.526 inches internal diameter. Other typical dimensions in the case of one-half inch strand include a distance of substantially six inches between points 12 and 13 of elongate body 7, a distance of three-fourths inch between point 12 and the right-hand end of body 7, a five-eighths inch outer diameter at point 12, and a one and one-eighth inches outer diameter at point 13, in the unswaged condition, with a one inch outer diameter at 13 after swaging.

As a rule of thumb, the total wall thickness of elongate body 7 after swaging is approximately equal to the strand diameter. Thus, using one-half inch strand, the swaged wall thickness would be one-quarter inch. The swaging deformation advantageously ranges from substantially 0 at point 12 to maximum swaging at point 13. As a further rule of thumb, the reduction in outer diameter at the area of maximum swaging may be approximately 12 percent to 15 percent of the after-swaging outer diameter. However, dimensions, tolerances, degree of swaging, etc. for particular operating conditions may be determined by calculation and experimentation within the skill of the art.

While the provision of the taper on elongate body 7 provides an easy manner of effecting the progressive swaging using uniform swaging dies, it will be understood that a generally corresponding effect could be accomplished by using tapered swaging dies or other form of swage on an unswaged fitting of substantially uniform outer diameter, the particular device used for swaging or deformation being not critical to the invention. Furthermore, the progressive increase in swaging need not be uniform, and the initially tapered portion may encompass less than the full length of body to be swaged. There may be an initial length of increasing swaging, followed by a length of uniformly swaged body, in which case the unswaged body may have an initial outward taper followed by a portion of generally uniform diameter.

The method of fabrication will be self-evident, it being a simple matter of assembling the fitting, the strand and the insert, and then swaging the elongate body 7 to the desired degree.

In a typical example that has performed quite satisfactorily, the strand is a seven wire strand of high carbon steel (carbon 0.75 percent to 0.85 percent), although any carbon steel or alloys thereof could be used assuming adequate strength is developed and the end fittings are adapted appropriately in accordance with the invention. Wire rope possibly could be used. However, high carbon steel, multi-wire strand is much to be preferred because of its resistance to stretch and creep. Even more to be preferred is low-relaxation strand, which is widely and advantageously used in prestressed concrete. Low-relaxation strand is well-known in the art, and can be manufactured as disclosed in U.S. Pat. No. 3,398,258 and U.S. Pat. No. 3,196,052. Standard specifications for seven-wire stress-relieved strand, including low-relaxation strand, suitable for use in the present invention, are in accordance with ANSI/ASTM A 416-74. A particularly suitable low-relaxation strand is manufactured and sold by Florida Wire and Cable Company, Jacksonville, Fla., under the trademark "LO-LAX". Such low-relaxation strand has an increase in yield strength of approximately five percent over stress-relieved strand, and exhibits greatly improved fatigue properties.

The end fittings advantageously are of 1040 heat treated steel, and are formed by drop forging. Depending on the accuracy of the drop-forging, it is entirely feasible to swage the forged fitting, but in some instances machining of the forged fitting may be necessary before swaging.

Particularly when used as oil well sucker rods, the assembled sections are covered or coated with plastic to minimize corrosion and down-well abrasion. Advantageously this is fiberglass reinforced resin or plastic, applied to the sections by wrapping while the sections are under tension, the tension being maintained until the plastic, typically a thermosetting polymer, is cured. Upon release of the tension, the fiberglass reinforced plastic will be under compression, thus contributing to the life of the sucker rod section. Any unwound part, including couplings between sections, may be coated with an epoxy such as diethylene triamine, a typical example being Epon 828, produced by Shell Chemical. Since fiberglass has very little, if any, affinity for paraffin, such rods are very desirable in high paraffin oil wells.

The abrasion resistance of the fiberglass-resin surface is important. Equally as important is the combination of light weight and flexibility of the coated rod in combatting abrasion. Thus, few deep oil wells are actually straight such that the sucker rod string does not rub against the well tubing at bends or curves. Since my improved rod string is light and flexible, the abrading force normal to the tubing, caused by weight and stiffness, is less than in conventional sucker rods.

The fiberglass/resin coating also avoids the need for deducting a corrosion allowance in calculating rod strength. Additionally, the fiberglass winding can be enlarged in diameter at selected points to function as tubing wipers, or to serve as stops for rod mounted wipers, which frequently slide down on the rod and collect at the couplings.

The swaging operation may be effected as desired; good results have been achieved using an Esco Mark 150 500-ton swaging press.

The length of the lubricating sleeve insert may be varied as desired. In the typical example for which detailed dimensions were given previously, an insert length of 3.5 inches was found satisfactory, but this can be varied to give optimum performance for given pumping conditions. The degree of swaging is also variable, and is not confined to the examples given herein.

From the foregoing, it will be seen that this invention is well adapted to attain all of the ends and objects and advantages hereinabove set forth, together with other advantages which are obvious and inherent to the apparatus. It will be understood that certain features and subcombinations are of utility and may be employed without reference to other features and combinations. Many possible embodiments may be made of the invention without departing from the scope thereof, and hence it is to be understood that all matter herein set forth or shown in the accompanying drawings is to be interpreted as illustrative and not in a limiting sense.

I claim:

1. A sucker rod section assembly for connection with other sucker rod sections to form a sucker rod string for use in actuating a pump in a well, said sucker rod section assembly comprising:

an elongate metallic member of multi-wire steel strand;

first and second end pieces mounted on the ends of said elongate member;

each end piece having means for connection with an end piece of an adjacent section to form a sucker rod string;

at least one of said end pieces comprising a steel body having a passageway formed therein and opening from one end thereof, one end portion of said steel strand being disposed in said passageway and embraced by the passageway walls, said steel body being substantially continuously deformed into gripping engagement with said end portion of said steel strand, said deformation being continuous but non-uniform such that the degree of gripping engagement over at least part of the length of said end portion continuously and progessively increases (in progressing) in the direction from the open end of said passageway toward the terminal end of said end portion of the steel strand such that when said one end piece and said steel strand are placed under tensile load there is a relatively gradual and continuously progressive transfer of load from the steel strand to said one end piece along said end portion, and hence a continuous relatively gradual load transition in the end portion of said steel strand so as to reduce the possibility of fatigue failure under repetitive tensile loading.

2. Apparatus as claimed in claim 1 wherein said steel strand is of high carbon steel (carbon 0.75 percent to 0.85 percent).

3. Apparatus as claimed in claim 2 wherein the strand is low-relaxation strand.

4. Apparatus as claimed in claim 1 wherein said deformation of said steel body is by swaging to a progressively greater degree in progressing in the direction from the open end of said passageway toward the terminal end of said end portion.

5. Apparatus as claimed in claim 4 further comprising a relatively short and thin sleeve insert surrounding part of the end portion of said strand in said passageway in the area of relatively slight swaging and terminating short of the area of greatest swaging, said sleeve insert being of a relatively non-galling and non-abrading material softer than the steel material of said steel body or said strand so as to provide a lubricating effect and yet permit gradual load transfer between the end portion and the end pieces.

6. In combination, for use in oil well sucker rod string, a multi-wire steel strand, a steel end fitting mounted on at least one end portion of the strand and encompassing said end portion, and means effecting a gripping engagement between said strand and said end fitting that continuously and progressively increases in the direction toward the terminal end of the end portion of the strand inside the end fitting, such that when said strand and end fitting are placed under tensile load there is a continuously progressively increasing transfer of load from the strand to the end fitting along said strand end portion, and hence a continuous relatively gradual load transition in the end portion of the strand, whereby to avoid fatigue failure due to abrupt load transitions in the strand under repetitive tensile loading.

7. Apparatus as claimed in claim 6 wherein said means comprises a body portion of the end fitting having therein a passageway in which the end portion of said strand is disposed, the body portion being continuously and progressively deformed into increasing gripping engagement with the end portion of the strand along the end portion toward said terminal end.

8. Apparatus as claimed in claim 7 wherein the progressive deformation of said body portion is such as to form striations in the wall surfaces of said passageway because of deformation thereof about the exterior wires of said strand, said striations increasing in depth along said wall surfaces toward the terminal end of said strand.

9. Apparatus as claimed in claim 8 further comprising a relatively short and thin lubricating sleeve insert surrounding part of the end portion of said strand in said passageway in the area of relatively slight deformation of the body portion where relative movement can occur between the strand wires, the passageway wall surfaces, and the relatively shallow striations, said sleeve insert being of a relatively non-galling and non-abrading material softer than the material of said body portion or said strand.

10. Apparatus as claimed in claim 9 wherein said sleeve insert terminates short of the area of maximum deformation and depth of striations.

11. Apparatus as claimed in claim 10 wherein said deformation is by swaging to a progressively greater degree along at least part of the length of said body portion.

12. Apparatus as claimed in claim 11 wherein said swaging at the area of maximum swaging reduces the diameter of the body portion by an amount approximately equal to about 12 percent of the final diameter.

13. Apparatus as claimed in claim 11 wherein the final wall thickness of the swaged body portion is approximately equal to one-half the strand diameter.

14. A method of manufacturing a multi-wire metallic strand with an end connection piece for use under repetitive tensile loading conditions so as to reduce the possibility of fatigue failure of the strand in the area of the end connection piece, comprising:

providing an end connection piece having a body portion with a passageway formed therein and opening from one end thereof, inserting into the passageway an end portion of a multi-wire metallic strand such that there is substantially minimum clearance between the passageway wall and the strand, and deforming said body portion so as to grippingly engage said strand end portion to a progressively increasing degree considered in the direction along the end portion toward its terminal end, such that the gripping engagement increases from a minimum to a maximum along the strand end portion.

15. A method as claimed in claim 14, comprising, prior to deformation, placing a sleeve insert around part of said end portion in said passageway relatively away from the area of maximum deformation, said sleeve insert being of a relatively non-galling and non-abrading material softer than the material of said body portion and said strand.

16. A method as claimed in claim 15 where said deformation is by swaging.

17. A method as claimed in claim 11 wherein said body portion, before deformation, is elongate and its exterior surface tapers outwardly in progressing away from the end from which said passageway opens, and said swaging is such as to at least reduce the taper of said body portion.

18. A method as claimed in claim 16 wherein said swaging is such as to form striations in the wall surfaces of said passageway because of deformation thereof about the exterior wires of said strand, said striations increasing in depth along said wall surface in progressing toward the terminal end of said strand.

19. A method as claimed in claim 18 wherein said sleeve insert is disposed in the area of relatively shallow striations, and terminates short of the area of deepest striations.

20. A method as claimed in claim 19 wherein end connection pieces are located on both ends of said strand, and the assembly forms a sucker rod section for connection with other sections to form a sucker rod string for an oil well pump.

21. A method as claimed in claim 20 further comprising coating said strand and end connection pieces with fiberglass reinforced resin.

* * * * *